United States Patent
Liu (10) Patent No.: US 12,501,018 B2
(45) Date of Patent: Dec. 16, 2025

(54) DISPLAY DEVICE

(71) Applicant: WUHAN CHINA STAR OPTOELECTRONICS TECHNOLOGY CO., LTD., Wuhan (CN)

(72) Inventor: Yan Liu, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 936 days.

(21) Appl. No.: 17/419,262

(22) PCT Filed: May 31, 2021

(86) PCT No.: PCT/CN2021/097103
§ 371 (c)(1),
(2) Date: Jun. 28, 2021

(87) PCT Pub. No.: WO2022/241820
PCT Pub. Date: Nov. 24, 2022

(65) Prior Publication Data
US 2024/0040107 A1 Feb. 1, 2024

(30) Foreign Application Priority Data
May 20, 2021 (CN) .......... 202110550412.2

(51) Int. Cl.
*H04N 13/302* (2018.01)
*F21V 8/00* (2006.01)
(Continued)

(52) U.S. Cl.
CPC ......... *H04N 13/302* (2018.05); *G02B 6/0051* (2013.01); *G02B 6/0053* (2013.01);
(Continued)

(58) Field of Classification Search
CPC .............. H04N 13/302; H04N 13/346; H04N 2213/001; H04N 13/305; G02B 6/0051;
(Continued)

(56) References Cited

U.S. PATENT DOCUMENTS

2011/0221996 A1 9/2011 Shiau et al.
2012/0154450 A1* 6/2012 Aho .................. G02B 6/0038
362/613
(Continued)

FOREIGN PATENT DOCUMENTS

CN 1904668 A 1/2007
CN 101872072 A 10/2010
(Continued)

OTHER PUBLICATIONS

International Search Report in International application No. PCT/CN2021/097103, mailed on Dec. 2, 2021.
(Continued)

*Primary Examiner* — Pinping Sun
*Assistant Examiner* — Gabriel A Sanz
(74) *Attorney, Agent, or Firm* — PV IP PC; Wei Te Chung (57) ABSTRACT

A display device is provided. The display device includes a display module including a display panel, a naked-eye 3D grating, and a reverse prism sheet disposed between the display panel and the naked-eye 3D grating. The reverse prism sheet includes a substrate and a prism layer disposed on a side of the substrate, and the prism layer is disposed toward the display panel. The display device provided by the present disclosure may diverge the light emitted from the backlight through the display panel into the naked-eye 3D grating to enhance the stereoscopic optical effect.

17 Claims, 5 Drawing Sheets (51) Int. Cl.
*H04N 13/346* (2018.01)
*G02F 1/1335* (2006.01)
*G02F 1/13357* (2006.01)

(52) U.S. Cl.
CPC ......... *G02B 6/0068* (2013.01); *H04N 13/346* (2018.05); *G02B 6/0073* (2013.01); *G02F 1/133504* (2013.01); *G02F 1/133615* (2013.01)

(58) Field of Classification Search
CPC .. G02B 6/0053; G02B 6/0068; G02B 6/0073; G02B 30/30; G02F 1/133504; G02F 1/133615; G02F 1/133331; G02F 1/133308; G02F 1/1335; G02F 1/1336
See application file for complete search history.

(56) References Cited

U.S. PATENT DOCUMENTS

| | | | | |
|---|---|---|---|---|
| 2014/0078775 | A1* | 3/2014 | Lee | G02B 6/0038 362/613 |
| 2015/0055053 | A1* | 2/2015 | Sasaoka | G02F 1/1336 349/58 |
| 2015/0301266 | A1* | 10/2015 | Araki | G02B 6/005 362/606 |
| 2016/0313494 | A1* | 10/2016 | Hamilton | C03C 15/00 |
| 2017/0184868 | A1* | 6/2017 | Lee | G02B 6/0068 |
| 2017/0329066 | A1* | 11/2017 | Harada | G02B 5/0294 |
| 2018/0059316 | A1* | 3/2018 | Zhang | G02B 6/0055 |
| 2018/0180794 | A1* | 6/2018 | Harada | G02B 5/0221 |
| 2018/0348816 | A1* | 12/2018 | Lee | H04R 5/02 |
| 2019/0105938 | A1* | 4/2019 | Holmes | G02B 5/1861 |
| 2019/0107665 | A1* | 4/2019 | Bu | G02B 6/005 |
| 2019/0113783 | A1* | 4/2019 | Ji | G02F 1/133504 |
| 2021/0157165 | A1* | 5/2021 | Shi | G02F 1/134336 |
| 2023/0350123 | A1* | 11/2023 | Cui | G09F 9/00 |
| 2023/0408868 | A1* | 12/2023 | Lin | G02B 5/003 |

FOREIGN PATENT DOCUMENTS

| | | |
|---|---|---|
| CN | 102278711 A | 12/2011 |
| CN | 102608767 A | 7/2012 |
| CN | 210835467 U | 6/2020 |
| JP | 2006293106 A | 10/2006 |
| KR | 20180051116 A | 5/2018 |

OTHER PUBLICATIONS

Written Opinion of the International Searching Authority in International application No. PCT/CN2021/097103, mailed on Dec. 2, 2021.

Chinese Office Action in corresponding Chinese Patent application No. 202110550412.2 dated Dec. 22, 2021, pp. 1-9.

* cited by examiner

DISPLAY DEVICE

RELATED APPLICATIONS

This application is a Notional Phase of PCT Patent Application No. PCT/CN2021/097103 having international filing date of May 31, 2021, which claims the benefit of priority of Chinese Patent Application No. 202110550412.2 filed on May 20, 2021. The contents of the above applications are all incorporated by reference as if fully set forth herein in their entirety.

FIELD OF INVENTION

The present disclosure relates to the technical field of display, and in particular, relates to a display device.

BACKGROUND OF INVENTION

With the development of electronic technology, display devices, such as smart phones, have become more and more intelligent. The display devices can display images through its display panel.

With display technology advancing rapidly, liquid crystal modules (LCM) gradually replace cathode ray tubes (CRT) technology and are widely used in mobile phones, tablets, TVs, vehicles, and wearable devices. Furthermore, three-dimensional (3D) display technology equipped with LCM has attracted much attention in recent years, and its display effect is more three-dimensional and realistic.

Traditional 3D display technology mostly uses red and blue split screen or polarization technology to display 3D effect by wearing 3D glasses. This kind of special glasses supporting equipment limits the use of 3D display, causing viewing inconvenience and being adverse to the promotion of 3D display.

SUMMARY OF INVENTION

Technical Problem

In recent years, naked-eye 3D displays equipped with gratings have become the focus. This kind of technology does not require wearing glasses and can obtain 3D stereoscopic effect by directly viewing with naked eye. However, current naked-eye 3D display devices still have many shortcomings in terms of 3D display effects.

Technical Solution

An embodiment of the present disclosure provides a display device to improve the technical problem of poor 3D display effect of the existing naked-eye 3D display devices.

The embodiment of the present disclosure provides a display device comprising a display module including a display panel, a naked-eye 3D grating, and a reverse prism sheet disposed between the display panel and the naked-eye 3D grating, wherein the reverse prism sheet includes a substrate and a prism layer disposed on a side of the substrate, and the prism layer is disposed toward the display panel.

Beneficial Effects

In the display device provided through the embodiment of the present disclosure, a reverse prism sheet is disposed between the display panel and the naked-eye 3D grating, which can diverge the light emitted from the backlight through the display panel into the naked-eye 3D grating to enhance the 3D optical effect.

DESCRIPTION OF DRAWINGS

In order to more clearly describe the technical solutions in the embodiments of the present disclosure, the following will briefly introduce the drawings that need to be used in the description of the embodiments. Obviously, the drawings in the following description are only some embodiments of the present disclosure, and for those skilled in the art, other drawings can be obtained based on these drawings without creative work.

In order to have a more complete understanding of the present disclosure and its beneficial effects, the following description will be given in conjunction with the drawings. Among them, the same reference numerals in the following description indicate the same parts.

DETAILED DESCRIPTION OF PREFERRED EMBODIMENTS

Figure 1:
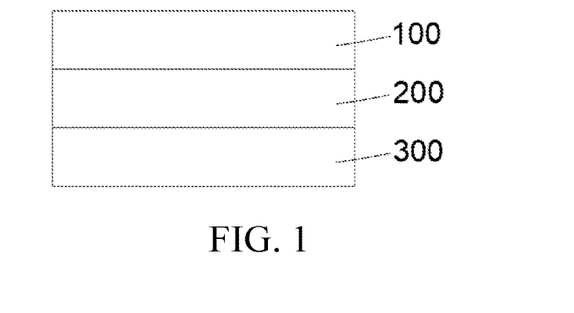
FIG. 1 is a schematic structural diagram of a display device according to an embodiment of the present disclosure.
Figure 2:
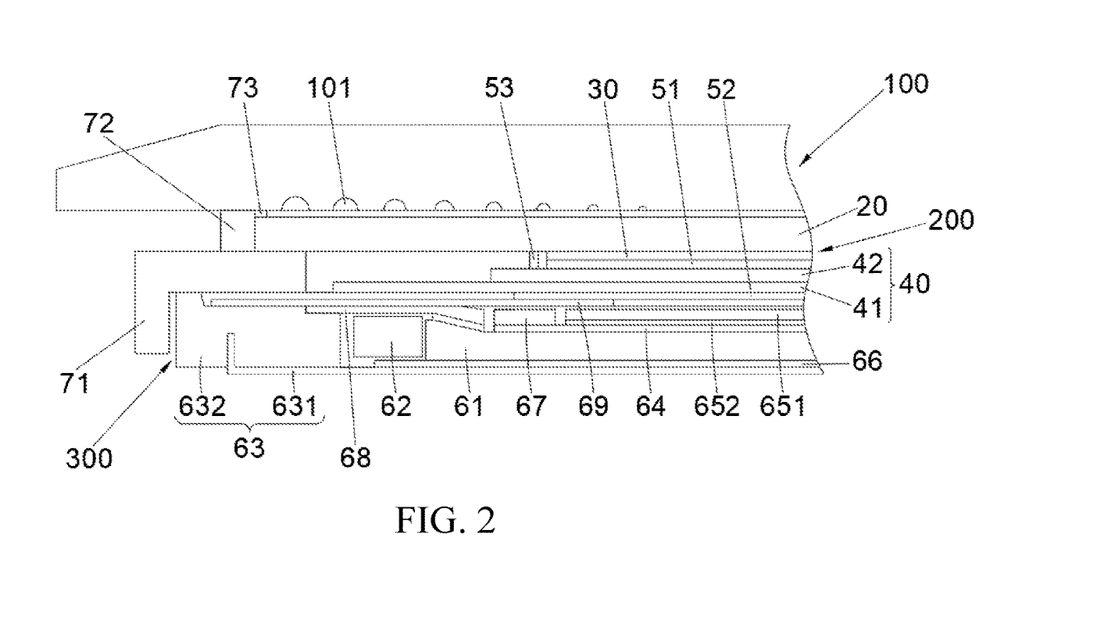
FIG. 2 is a schematic structural diagram of a naked-eye 3D display device according to the embodiment of the present disclosure.

Refer to FIG. 1. An embodiment of the present disclosure provides a display device, the display device comprises a backlight module 300, a display module 200, and a cover plate 100 stacked in sequence. The display device may be a naked-eye 3D display device (as shown in FIG. 2) or a non-3D display device. The following takes a naked-eye 3D display device as an example for description.

In the related art, the stereoscopic display effect of the naked-eye 3D display device is insufficient to meet the needs of current users. Based on the consideration, at least one of the cover plate 100, the display module 200, and the backlight module 300 in the naked-eye 3D display device of the embodiment of the present disclosure is designed to improve the stereoscopic display and enhance the stereoscopic display effect. The following will explain one by one.

Figure 3:
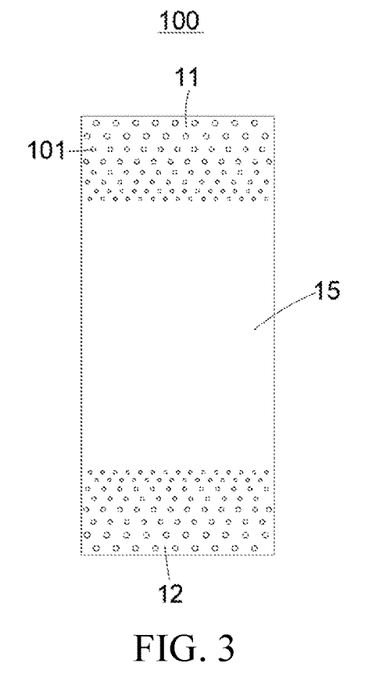
FIG. 3 is a schematic diagram of a first structure of a cover plate according to the embodiment of the present disclosure.
Figure 4:
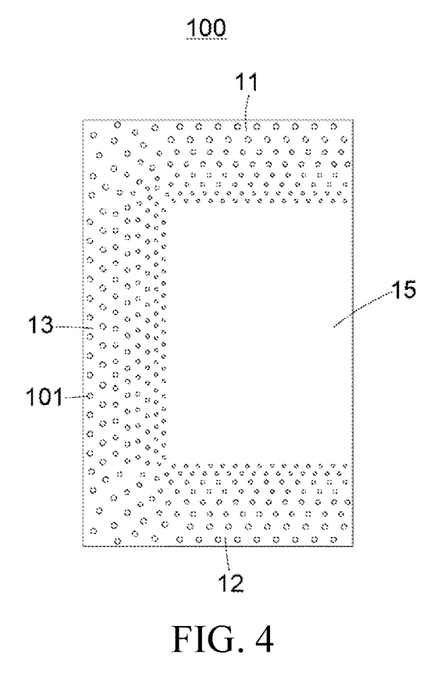
FIG. 4 is a schematic diagram of a second structure of a cover plate according to the embodiment of the present disclosure.
Figure 5:
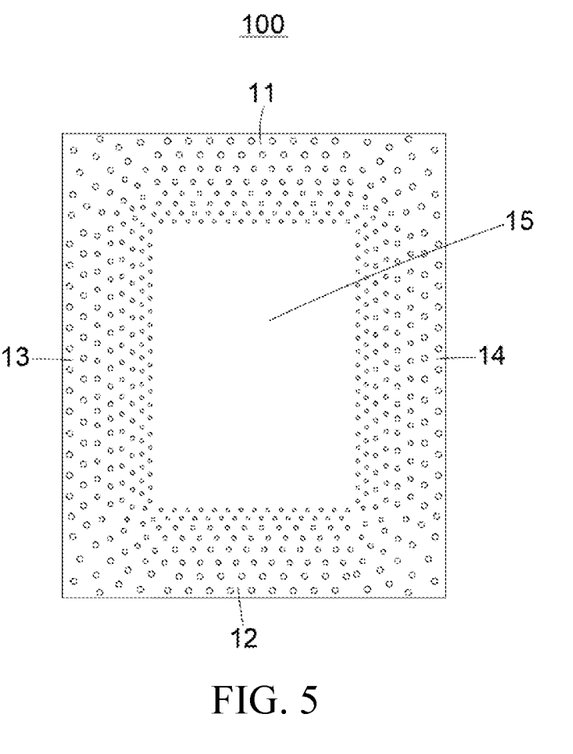
FIG. 5 is a schematic diagram of a third structure of a cover plate according to the embodiment of the present disclosure.

Refer to FIG. 3, FIG. 4, or FIG. 5, and refer to FIG. 2 at the same time. The embodiment of the present disclosure provides a cover plate 100, and the cover plate 100 is disposed on a light side of the display module 200. A surface of the cover plate 100 has a dot region and a non-dot region 15, the dot region is arranged around a periphery of the non-dot region, and a plurality of recesses are formed at intervals in the dot region. Specifically, the dot region may be disposed on one side, two sides, three sides, or fourth side of the non-dot region 15, and the cover plate 100 may be used to cover an ordinary display module or a display module with naked-eye 3D display function. When the cover plate 100 is used to cover a display module with a naked-eye 3D display function, the dot region may be disposed to correspond to an edge of the display module. The recesses 101 in the dot region may diffusely reflect the light emitted from the display module into the cover plate 100, and improve the light diffusion angle at the edge of the display module. The viewing angle and stereoscopic display effect of naked-eye 3D display are improved.

Refer to FIG. 3. In some embodiments, the dot region includes a first area 11 and a second area 12, wherein the first area 11 and the second area 12 are respectively disposed on opposite sides of the non-dot region 15. When applied to a naked-eye 3D display device, the first area 11 and the second area 12 may be arranged corresponding to the left and right sides of the display device, respectively. When viewers look from the positions on the left and right sides of the display device, the light diffusion effect of the first area 11 and the second area 12 improves the viewing angle of the left and right sides of the display device. The stereoscopic display effect of the display device from the left and right sides (squint) may be improved.

Refer to FIG. 4. In other embodiments, the dot region includes a first area 11, a third area 13, and a second area 12 sequentially arranged along a periphery of the non-dot region, the first area 11 and the second area 12 are arranged opposite each other, the third area 13 is arranged between the first area 11 and the second area 12, and two ends of the third area 13 are respectively connected to the first area 11 and the second area 12. When applied to the naked-eye 3D display device, the first area 11 and the second area 12 may respectively correspond to the left and right sides of the display device, and the third area 13 may correspond to the lower side of the display device. When viewers look from the left, right, or lower side of the display device, the light diffusion effect of the first area 11 and the second area 12 may increase the viewing angle of the left and right sides of the display device, and the light diffusion effect of the third area 13 may increase the viewing angle of the lower side of the display device. Therefore, the stereoscopic display effect when viewing the display device from the left side (squint), right side (squint), or lower side (looking up) may be improved.

Refer to FIG. 5. In other embodiments, the dot region includes a first area 11, a third area 13, a second area 12, and fourth area 14 sequentially arranged along a periphery of non-dot region 15, wherein the first area 11 and the second area 12 oppose each other, the third area 13 and the fourth area 14 oppose each other, the first area 11, the third area 13, the second area 12, and the fourth area 14 are connected end to end in sequence to form a closed loop. When applied to a naked-eye 3D display device, the first area 11 and the second area 12 may respectively correspond to the left and right sides of the display device, and the third area 13 and the fourth area 14 may respectively correspond to the lower and upper sides of the display device. When viewers watch from the left, right, lower or upper side of the display device, the light diffusion effects of the first area 11, the second area 12, the third area 13, and the fourth area 14 may respectively increase the viewing angles of the left, right, lower, and upper sides of the display device. Therefore, the stereoscopic display effect when viewing the display device from the left side (oblique view), right side (oblique view), lower side (look up), or upper side (top view) may be improved.

In the embodiment of the present disclosure, the sizes of the recesses 101 arranged in the dot region may be disposed to keep the same direction from the non-dot region 15 to the edge of the cover plate 100, gradually increase or decrease. The distribution density of the recesses 101 arranged in the dot region may be disposed to keep the same direction from the non-dot region 15 to the edge of the cover plate 100, gradually increase or decrease. It should be noted that when the sizes of the recesses 101 arranged in the dot region gradually decreases from the non-dot region 15 to the edge of the cover 100 and the distribution density of the recesses 101 arranged in the dot region gradually increases from the non-dot region 15 to the edge of the cover plate 100, the diffuse reflection effect of the dot region gradually increases from the non-dot region 15 to the edge of the cover plate 100. Thus, the viewing angle and the stereoscopic display effect of the edge area of the naked-eye 3D display device are significantly improved.

In the embodiment of the present disclosure, the shapes of the recesses 101 arranged in the dot region may be disposed to various shapes, such as a semicircular sphere, a semi-ellipsoid, a rectangular parallelepiped, a cube shape, and an irregular shape. It should be noted that when the shapes of the recesses 101 arranged in the dot region are all semi-spherical. Compared to other shapes, the semi-spherical recesses 101 may achieve a better light diffusion effect, so as to achieve better 3D display effect.

In some embodiments, an area of the dot region is smaller than an area of the non-dot region 15.

The cover plate 100 provided by the embodiment of the present disclosure may be applied to display devices, such as mobile phones, tablet computers, televisions, computer monitors, vehicle-mounted display devices, notebook computers, and wearable smart devices.

In some embodiments, an edge of the surface of the cover plate 100 on the side where the recesses 101 are defined may also be coated with shading ink. The area where the shading ink is located is used to form a non-display area (frame) of the display device, and the area inside the shading ink forms a display area of the display device. The dot region is located at the junction of the display area and the non-display area. That is, a part of the dot region is located in the non-display area, and the other part is located in the display area.

How to improve the 3D display effect of the naked-eye 3D display device by improving the structure of the cover plate 100 is described above. How to improve the 3D display effect of the naked-eye 3D display device by improving the display module 200 is described as follows.

Figure 6:
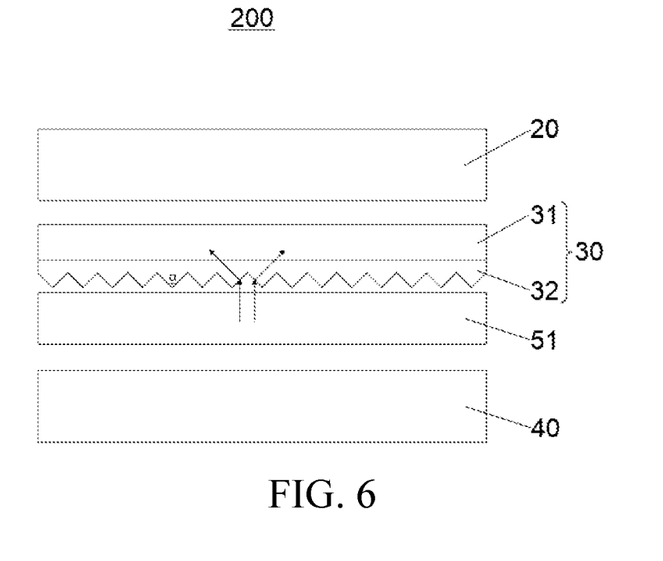
FIG. 6 is a schematic diagram of a first structure of a display module according to the embodiment of the present disclosure.
Figure 7:
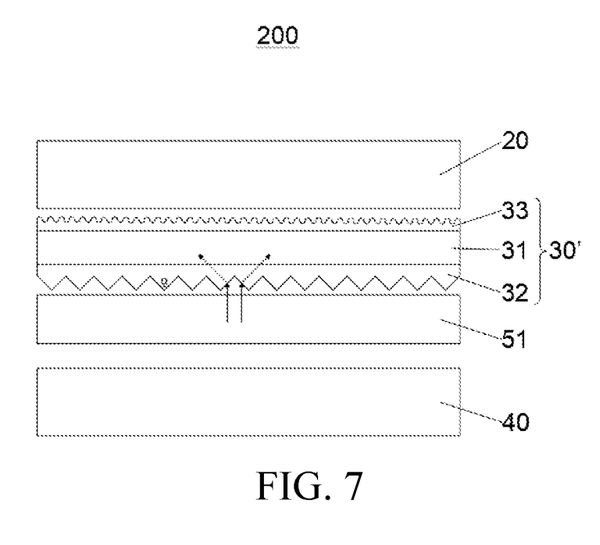
FIG. 7 is a schematic diagram of a second structure of a display module according to the embodiment of the present disclosure.

Refer to FIG. 6 or FIG. 7, and refer to FIG. 2 at the same time. The embodiment of the present disclosure also provides a display module 200. The display module 200 includes a display panel 40, a naked-eye 3D grating 20, and a reverse prism sheet 30. The reverse prism sheet 30 is disposed between the display panel 40 and the naked-eye 3D grating 20. The reverse prism sheet 30 includes a substrate 31 and a prism layer 32 disposed on a side of the substrate 31, and the prism layer 32 is disposed toward the display panel 40. The light emitted from the backlight and passing through the display panel 40 vertically enters the reverse prism sheet 30 and is diverged into various angles, and then passes through a naked-eye grating 24 to perform optical simulation calculations to form a real three-dimensional image. In other words, in the display module 200 of the embodiment of the present disclosure, by arranging the reverse prism sheet 30 between the display panel 40 and the naked-eye 3D grating 20, the light emitted from the backlight through the display panel 40 may be diffused and then enter the naked eye 3D grating 20 to enhance the stereoscopic optical effect.

In some embodiments, a prism angle α of the prism layer 32 is 90°.

Specifically, a material of the substrate 31 is a transparent material, such as Polyethylene terephthalate (PET).

Refer to FIG. 7. In some embodiments, a reverse prism sheet 30' further includes a haze layer 33 disposed on A side of the substrate 31 away from the prism layer 32, and the haze layer 33 is disposed toward the naked-eye 3D grating 20. In the reverse prism sheet 30', the prism layer 32 plays a role of diverging incident light, and the haze layer 33 plays a role of homogenizing the divergent light. The cooperation of the prism layer 32 and the haze layer 33 achieves a better light diffusion effect, so that the naked-eye 3D display device presents a better stereoscopic display effect.

In some embodiments, a surface of the haze layer 33 has an uneven microstructure.

Refer to FIG. 2, in some embodiments, a stopper member 53 is further provided between the display panel 40 and the naked-eye 3D grating, and the stopper member 53 is disposed around a periphery of the reverse prism sheet 30 to restrict a movement of the reverse prism sheet 30. The reverse prism sheet 30 is prevented from falling off from the display device, and the structural stability of the display device is improved.

In some embodiments, the stopper member 53 is foam, which may not only limit the position of the reverse prism sheet 30, but also achieve a buffering effect when the display device is pressed by an external force, thereby improving the structural stability of the display device.

Refer to FIG. 2. In some embodiments, the display panel 40 includes a thin film transistor (TFT) substrate 41, a color filter (CF) substrate 42 disposed above the TFT substrate 41, and a liquid crystal layer disposed between the TFT substrate 41 and the CF substrate 42. In addition, an upper polarizer 51 is provided above the CF substrate 42 and a lower polarizer 52 is provided below the TFT substrate 41. The upper polarizer 51 and the lower polarizer 52 jointly achieve a polarization effect. The reverse prism sheet 30 is disposed between the upper polarizer 51 and the naked-eye 3D grating 20 to enhance the optical 3D effect. The stopper member 53 is disposed above the edge of the CF substrate 42. The stopper member 53 is disposed around the periphery of the reverse prism sheet 30 to limit the reverse prism sheet 30. The reverse prism sheet 30 is prevented from falling off from the display device, and the structural stability of the display device is improved. In this embodiment, the stopper member 53 is foam, which may limit the reverse prism sheet 30. When the display device is pressed by an external force, the stopper member 53 may also achieve a buffering effect and improve the structural stability of the display device.

The display module 200 may be applied to display devices such as mobile phones, tablet computers, televisions, computer monitors, vehicle-mounted display devices, notebook computers, and wearable smart devices.

The above respectively introduces the improvement of the 3D display effect of the naked-eye 3D display device by improving the structure of the cover plate 100 and the display module 200. How to improve the 3D display effect of the naked-eye 3D display device by improving the structure of the backlight module 300 is described as follows.

Figure 8:
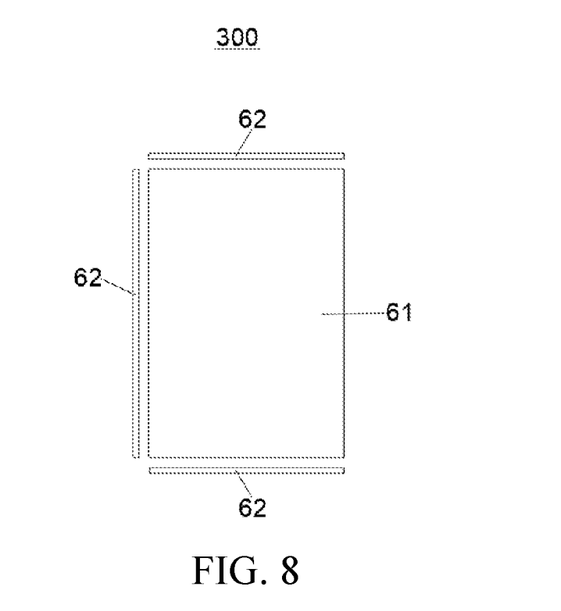
FIG. 8 is a schematic diagram of a first structure of a backlight module according to the embodiment of the present disclosure.
Figure 9:
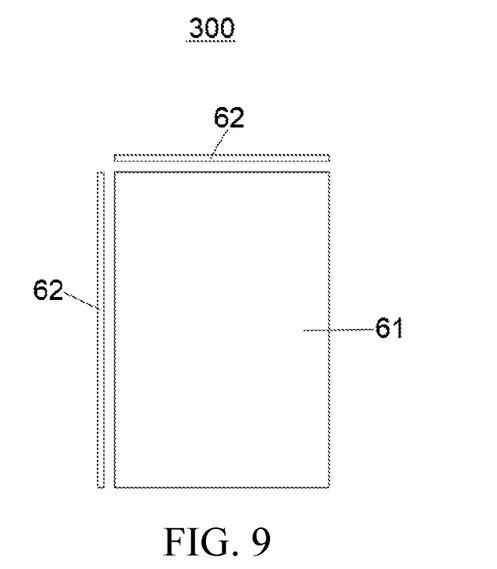
FIG. 9 is a schematic diagram of a second structure of a backlight module according to the embodiment of the present disclosure.
Figure 10:
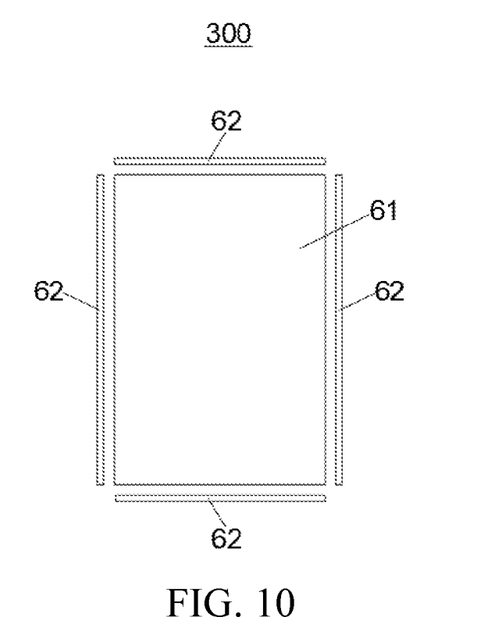
FIG. 10 is a schematic diagram of a third structure of a backlight module according to the embodiment of the present disclosure.

Refer to FIG. 8, FIG. 9 or FIG. 10, and refer to FIG. 2 at the same time. The embodiment of the present disclosure also provides a backlight module 300. The backlight module 300 is arranged on a light incident side of the display module 200. The backlight module includes a light guide plate 61 and a plurality of light bars 62. The light bars 62 are arranged on a side of the light guide plate 61, and the light bars have different light-emitting wavebands, and/or, the light bars 62 have different luminous brightness, and/or, the light bars 62 have different light-emitting angles. The backlight module 300 provided by the embodiments of the present disclosure may be applied to display devices, such as mobile phones, tablet computers, televisions, computer monitors, vehicle-mounted display devices, notebook computers, and wearable smart devices. Specifically, the display device may be a common display device or a display device with a naked-eye 3D display function. When the backlight module 300 is applied to a display device with a naked-eye 3D display function, the embodiment of the present disclosure designs the light bar 62 in the backlight module 300. The traditional single light bar is changed to multiple light bars 62 with different luminous wavebands and/or different luminous brightness and/or different luminous angles. Multiple light bars 62 may be respectively arranged on multiple sides of the light guide plate 61. Therefore, the optical cross-shading may be enhanced to improve the naked-eye 3D optical effect.

It can be understood that the backlight module 300 provided in the embodiment of the present disclosure is an edge-type backlight module.

Refer to FIG. 8, FIG. 9 or FIG. 10. In some embodiments, the shape of the light guide plate 61 may be shaped in a quadrilateral, such as a rectangle. As shown in FIG. 8, a number of the multiple light bars 62 may be three, which are respectively arranged on the three sides of the light guide plate 61, or, as shown in FIG. 9, the number of the multiple light bars 62 may also be two, which are respectively disposed on the two sides of the light guide plate 61, or, as shown in FIG. 10, the number of the multiple light bars 62 may also be four, which are respectively arranged on the four sides of the light guide plate 61.

Specifically, the light bar 62 may be a chip on board (COB) LED light bar or other types of LED light bars.

Refer to FIG. 2. In the embodiment of the present disclosure, the backlight module 300 also includes a backplate 63. The backplane 63 comprises an iron frame 631 and a plastic frame 632 connected to each other. The iron frame 631 includes a bottom plate and a side plate connected to the bottom plate, the side plate is embedded in the plastic frame 632 and integrated with the plastic frame 632. The light guide plate 61 and the light bars 62 are arranged on the bottom plate. A reflective sheet 66 is also disposed between the light guide plate 61 and the bottom plate of the iron frame 631 to improve the light utilization rate. A diffuser sheet 64 is arranged above the light guide plate 61, and the diffuser sheet 64 may make the light soft and uniform and play a role of concealment. A lower prism 652 and an upper prism 651 are sequentially arranged above the diffusion sheet 64, and the lower prism 652 and the upper prism 651 jointly achieve a light-enhancing effect. A light-shielding PET film 67 is disposed above the edge of the diffusion sheet 64 to avoid light leakage in the non-display area. The backlight module 300 also includes a flexible circuit board (FPC) 68 arranged above the light bars 62. A light-shielding tape 69 is arranged above the FPC 68. One end of the light-shielding tape 69 is bonded with a plastic frame 632, and the other end covers the edge of an upper surface of the upper prism 651 to further prevent light leakage in the non-display area.

The above respectively introduces the improvement of the 3D display effect of the naked-eye 3D display device by improving the structure of the cover plate 100, the display module 200, and the backlight module 300. In other words, improving one, two, or three kinds of the cover plate 100, the display module 200, and the backlight module 300 may improve the 3D display effect of the naked-eye 3D display device.

In some embodiments of the display device of the present disclosure, the cover plate 100 is the cover plate 100 provided with recesses 101 in the above-mentioned dot region. The display module 200 is a conventional structure in the prior art (the reverse prism sheet 30 is not provided). The backlight module 300 has a conventional structure in the prior art (a single light bar is used). In other words, the solution optimizes the 3D display effect of the naked-eye 3D display device by choosing to improve the cover plate 100 among the cover plate 100, the display module 200, and the backlight module 300.

In some embodiments of the display device of the present disclosure, the cover plate 100 has a conventional structure in the prior art (the dot region and the recesses 101 are not provided). The backlight module 300 is a conventional structure in the prior art (a single light bar is used). The display module 200 is the above-mentioned display module 200 in which the reverse prism sheet 30 is disposed between the display panel 40 and the naked-eye 3D grating 20. In other words, the solution optimizes the 3D display effect of the naked-eye 3D display device by choosing to improve the display module 200 among the cover plate 100, the display module 200, and the backlight module 300.

In some embodiments of the display device of the present disclosure, the cover plate 100 is a conventional structure in the prior art (the dot area and the recesses 101 are not provided), the display module 200 is a conventional structure in the prior art (the reverse prism sheet 30 is not provided), and the backlight module 300 is the above-mentioned backlight module 300 using a plurality of light bars 62. In other words, this solution optimizes the 3D display effect of the naked-eye 3D display device by choosing to improve the backlight module 300 among the cover plate 100, the display module 200, and the backlight module 300.

In some embodiments of the display device of the present disclosure, the cover plate 100 is the cover plate provided with recesses 101 in the above-mentioned dot region, the display module 200 is a display module 200 provided with a reverse prism sheet 30 between the above-mentioned display panel 40 and the naked-eye 3D grating 20, and the backlight module 300 has a conventional structure in the prior art (a single light bar is used). In other words, this solution optimizes the 3D display effect of the naked-eye 3D display device by selecting the cover plate 100, the display module 200, and the backlight module 300 to simultaneously improve the cover plate 100 and the display module 200. Compared with the technical solution that only improves the cover 100 or the display module 200, it is obvious that this solution may achieve a better 3D display effect.

In some embodiments of the display device of the present disclosure, the cover plate 100 is the cover plate 100 provided with recesses 101 in the above-mentioned dot region, the display module 200 is a conventional structure in the prior art (the reverse prism sheet 30 is not provided), and the backlight module 300 is the above-mentioned uses light bars 62 of the backlight module 300. In other words, this solution optimizes the 3D display effect of the naked-eye 3D display device by selecting the cover plate 100, the display module 200, and the backlight module 300 to simultaneously improve the cover plate 100 and the backlight module 300. Compared with the technical solution that only improves the cover 100 or the backlight module 300, it is obvious that this solution may achieve a better 3D display effect.

In some embodiments of the display device of the present disclosure, the cover plate 100 is a conventional structure in the prior art (the dot region and the recesses 101 are not provided), the display module 200 is the above-mentioned display module 200 with a reverse prism sheet 30 disposed between the display panel 40 and the naked-eye 3D grating 20, and the backlight module 300 is the above-mentioned backlight module 300 using the light bars 62. In other words, this solution optimizes the 3D display effect of the naked-eye 3D display device by selecting the cover plate 100, the display module 200, and the backlight module 300 to simultaneously improve the display module 200 and the backlight module 300. Compared with the technical solution that only improves the display module 200 or the backlight module 300, it is obvious that this solution can achieve a better 3D display effect.

In some embodiments of the display device of the present disclosure, the cover plate 100 is the cover plate 100 provided with recesses 101 in the above-mentioned dot region, the display module 200 is a display module 200 provided with a reverse prism sheet 30 between the above-mentioned display panel 40 and the naked-eye 3D grating 30, and the backlight module 300 is the above-mentioned backlight module 300 using the light bars 62. In other words, the solution optimizes the 3D display effect of the naked-eye 3D display device by selecting to simultaneously improve the cover plate 100, the display module 200, and the backlight module 300. Compared with the solution that only improves one or two of the cover 100, the display module 200 and the backlight module 300, it is obvious that this solution can achieve a better 3D display effect.

Furthermore, refer to FIG. 2, in the embodiment of the present disclosure, the display device further includes a middle frame 71 in a snap-fit engagement on the plastic frame 632 for supporting the naked-eye 3D grating to protect the display panel 40 from being crushed. A silicone strip 72 is further disposed between the middle frame 71 and the cover plate 100, and the silicone strip 72 arranged around a periphery of the naked-eye 3D grating 20 to limit a position of the naked-eye 3D grating 20. An inner side of the silicone strip 72 is further provided with a buffer strip 73 between the cover plate 100 and the naked-eye 3D grating 20. The silicone strip 72 and the buffer strip 73 protect the naked-eye 3D grating 20 together. In some embodiments, the buffer strip 73 is foam.

The display device provided by the embodiment of the present disclosure may be any product or component with a display function, such as a mobile phone, a tablet computer, a television, a computer monitor, a vehicle-mounted display device, a notebook computer, and a wearable smart device.

The display device provided by the embodiment of the present disclosure is described in detail above, and specific examples are used in this article to illustrate the principle and implementation of the present disclosure. The description of the above embodiment is only used to help understand the method and core idea of the present disclosure. At the same time, for those skilled in the art, according to the idea of the present disclosure, there will be changes in the specific implementation and the scope of the present disclosure. In summary, the content of this specification should not be construed as a limitation to the present disclosure.

What is claimed is:

1. A display device, comprising
a display module including a display panel, a naked-eye 3D grating, and a reverse prism sheet disposed between the display panel and the naked-eye 3D grating;
wherein the reverse prism sheet includes a substrate and a prism layer disposed on a side of the substrate, and the prism layer is disposed toward the display panel;
wherein a plurality of prism units are formed on and protrude from the prism layer toward the display panel, and each of the prism units has a triangular cross-section;
wherein the reverse prism sheet further includes a haze layer formed integrally and uniformly by the same material and disposed on a side of the substrate away from the prism layer, and the haze layer is disposed toward the naked-eye 3D grating;
wherein the display device further includes a cover plate disposed on a light emitting side of the display module, a surface of the cover plate facing the display module has a dot region and a non-dot region, the dot region is arranged around a periphery of the non-dot region, and a plurality of recesses are formed at intervals in the dot region;
wherein sizes of the recesses disposed in the dot region gradually increase radially from the non-dot region to an edge of the cover plate, and distribution densities of the recesses arranged in the dot area gradually decrease radially from the non-dot region to the edge of the cover plate.

2. The display device according to claim 1, wherein a stopper member is further provided between the display panel and the naked-eye 3D grating, and the stopper member is disposed around a periphery of the reverse prism sheet to restrict a movement of the reverse prism sheet.

3. The display device according to claim 2, wherein the stopper member is foam.

4. The display device according to claim 1, wherein an area of the dot region is smaller than an area of the non-dot region.

5. The display device according to claim 1, wherein the dot region includes a first area and a second area, and the first area and the second area are respectively disposed on opposite sides of the non-dot region.

6. The display device according to claim 1, wherein the dot region includes a first area, a third area, and a second area sequentially arranged along a periphery of the non-dot region, the first area and the second area are arranged opposite each other, the third area is arranged between the first area and the second area, and two ends of the third area are respectively connected to the first area and the second area.

7. The display device according to claim 1, wherein the dot region includes a first area, a third area, a second area, and fourth area sequentially arranged along a periphery of non-dot region, the first area and the second area oppose each other, the third area and the fourth area oppose each other, the first area, the third area, the second area, and the fourth area are connected end to end in sequence to form a closed loop.

8. The display device according to claim 1, wherein shapes of the recesses arranged in the dot region are all semi-spherical.

9. The display device according to claim 1, wherein the display device further includes a backlight module arranged on a light incident side of the display module; and
the backlight module includes a light guide plate and a plurality of light bars, the light bars are all arranged on a side of the light guide plate, and the light bars have different light-emitting wavebands.

10. The display device according to claim 1, wherein the display device further includes a backlight module arranged on a light incident side of the display module; and
the backlight module includes a light guide plate and a plurality of light bars, the light bars are all arranged on a side of the light guide plate, and the light bars have different luminous brightness.

11. The display device according to claim 1, wherein the display device further includes a backlight module arranged on a light incident side of the display module; and
the backlight module includes a light guide plate and a plurality of light bars, the light bars are all arranged on a side of the light guide plate, and the light bars have different light-emitting angles.

12. The display device according to claim 1, wherein the display device further includes a backlight module arranged on a light incident side of the display module;
the backlight module includes a light guide plate and a plurality of light bars, the light bars are all arranged on a side of the light guide plate;
the light bars have different light-emitting wavebands;
the light bars have different luminous brightness; and
the light bars have different light-emitting angles.

13. The display device according to claim 12, wherein the light guide plate is quadrilateral, a number of the light bars is 2, 3, or 4, and the light bars are respectively arranged on 2 sides, 3 sides, or 4 sides of the light guide plate.

14. The display device according to claim 12, wherein the backlight module further includes a backplane comprising an iron frame and a plastic frame connected to each other; and
the iron frame includes a bottom plate and a side plate connected to the bottom plate, the side plate is embedded in the plastic frame and integrated with the plastic frame, and the light guide plate and the light bars are arranged on the bottom plate.

15. The display device according to claim 1, wherein the display device further includes a middle frame in a snap-fit engagement on the plastic frame for supporting the naked-eye 3D grating; and
a silicone strip is further disposed between the middle frame and the cover plate, and the silicone strip arranged around a periphery of the naked-eye 3D grating to limit a position of the naked-eye 3D grating.

16. The display device according to claim 15, wherein an inner side of the silicone strip is further provided with a buffer strip between the cover plate and the naked-eye 3D grating.

17. The display device according to claim 16, wherein the buffer strip is foam.

* * * * *